US005809131A

United States Patent [19]
Ichikawa et al.

[11] Patent Number: 5,809,131
[45] Date of Patent: Sep. 15, 1998

[54] RINGER CIRCUIT FOR GENERATING SINE WAVE

[75] Inventors: Syuzi Ichikawa; Kazuhiro Umeda, both of Tokyo, Japan

[73] Assignee: Sarah Inc., Tokyo, Japan

[21] Appl. No.: 698,654

[22] Filed: Aug. 16, 1996

[51] Int. Cl.⁶ ...................................................... H04M 1/00

[52] U.S. Cl. .......................... 379/373; 379/373; 379/374; 379/375

[58] Field of Search .................................... 379/373, 374, 379/375, 418, 413, 251, 252, 179, 162, 424, 331; 363/18, 19

[56] References Cited

U.S. PATENT DOCUMENTS

| | | | |
|---|---|---|---|
| 5,260,996 | 11/1993 | Dillon et al. | 379/418 |
| 5,295,185 | 3/1994 | Washio | 379/331 |
| 5,321,596 | 6/1994 | Hurst | 379/418 |

FOREIGN PATENT DOCUMENTS

| | | |
|---|---|---|
| 713320 | 5/1996 | European Pat. Off. . |
| 3512150 | 10/1986 | Germany . |
| 730649 | 1/1995 | Japan . |

OTHER PUBLICATIONS

Dennis Morgan, "Tone–ringer circuit drives telephone–signal counter", Electronic Design, No. 18, Sep. 1984.

Akira Hasegawa, et al., "Desgn know how of switching regulators".

Takashi Kenjo et al., "Practical Guide for Electronic Circuit Design".

*Primary Examiner*—Dwayne Bost
*Assistant Examiner*—Keith Ferguson
*Attorney, Agent, or Firm*—Loeb & Loeb LLP

[57] ABSTRACT

A ringer circuit which generates a sine wave, where an amplified output of a transistor for oscillation is fed back to a base of the transistor. An output from an output transistors is a sine wave. When this sine wave output is supplied to a circuit for driving a ringer IC, in which the output is rectified and integrated, the current waveform appearing between input terminals of a rectifier is a sine wave, not in a pulse form. Therefore, the fluctuation appearing in the current waveform at the output of an integrator is insignificant, and the average current will increase. As a result, it is possible to drive a ringer IC regardless of a load (value of components in the integrator). Further, it is possible to drive a telephone set with only R and C. A ringing tone with less noise can be generated. Thus, a ringing tone can be generated regardless of the type of telephone set, without increasing the frequency of an oscillation output.

4 Claims, 8 Drawing Sheets

RINGER CIRCUIT FOR GENERATING SINE WAVE

BACKGROUND OF THE INVENTION a) Field of the Invention

The present invention relates to a ringer circuit which generates a ringing tone having a frequency of, e.g., 16 Hz.

b) Description of the Prior Art

FIG. 7 shows a structure of a ringer circuit in accordance with one example of the prior art. In this circuit, when a power supply A0, which is shown at the left of FIG. 7, supplies power to an oscillator B0 (including an amplifier), which is shown at the right of FIG. 7, the oscillator B0 generates a rectangular wave.

The power supply A0 is a switching power supply and has a transistor Q1 for oscillation, which is driven by a direct current applied to a base of the transistor Q1 via a resistor R1 from an external power supply +Vin, and by an emitter current of the transistor Q1 fed back to the base of the transistor Q1 via a positive feedback loop including a resistor R2 and a general purpose rectifying diode D3, the former driving being called the d.c. drive of Q1 and the latter the a.c. drive of Q1. Further, as the base circuit of the transistor Q1, there is provided a voltage regulator including a Zener diode D1, a general purpose rectifying diode D2 and a capacitor C2, thereby regulating the base d.c. potential of the transistor Q1. A collector current (oscillation output) of the transistor Q1, generated by the d.c. drive and the a.c drive, is then applied to a diode bridge D4 via a transformer T1, where it is full-rectified. The full-rectified output is applied between a collector and an emitter of a transistor Q2 for amplification, after being smoothed by a capacitor C4. The output from the transistor Q1 is also applied to a rectifier comprising a Shottky barrier diode D5 and a capacitor C3, the output of which is supplied, as power to a C-MOS comparator IC1 of the oscillator B0.

The oscillator B0 comprises the comparator IC 1 (which can be regarded as an oscillator, in a restricted sense) having a feedback circuit comprising resistors R3 and R4 and capacitors C5 and C6, and the transistor Q2 for amplification (which can be similarly regarded as an amplifier, in a restricted sense). A base current of the transistor Q2 is positively fed back to an input terminal of the comparator IC 1. This feedback causes the transistor Q2 to oscillate.

Now, if it is assumed that +Vin is 5 V, it is possible to use 4548B as IC1, 2SC4062 as Q1, 2SC3627 as Q2, and a diode rated at 5.1 V as D1, respectively. Further, C1 may be set to 100 $\mu$F, C2 to C4 to 10 $\mu$F, C5 to 1F, C6 to 1000 pF, R1 to 2. 2 kΩ, R2 to 1 kΩ, R3 to 100 kΩ, and R4 to 2.2 kΩ.

The output from the transistor Q2 is applied to a circuit shown either in FIG. 8 or FIG. 9. The circuit shown in FIG. 8 is a load circuit which is used in a certain type of telephone set well known in Japan (e.g., type 601 produced by Nippon Telegraph and Telephone Corporation) and is illustrated as an RC series circuit. The circuit shown in FIG. 9 is configured such that a diode bridge D full-wave rectifies an output from the circuit shown in FIG. 7 and supplies the rectified output to a ringer IC 10 via a load (RC integrator). The ringer IC 10 is driven by a d.c. signal supplied via the RC integrator which functions as a load, to generate a ringing tone.

FIGS. 10–12 respectively show voltage waveforms and current waveforms present at each terminal of the circuit of FIG. 9 when the oscillation output from the circuit in FIG. 7 is applied to the circuit. The output from the circuit in FIG. 7 has a rectangular voltage waveform and a pulse-like current waveform, as shown in FIG. 10. When a voltage and a current having such waveforms are applied across the terminals a and b of the circuit of FIG. 9, the voltage and current waveforms as shown in FIG. 11 appear between output terminals c and d of the diode bridge D, and are identical to the waveforms obtained by full-wave rectifying the waveforms shown in FIG. 10. Further, when a voltage and a current having the waveforms shown in FIG. 11 are applied to the load (RC integrator), the waveforms as shown in FIG. 12 appear between terminals e and f of the circuit of FIG. 9, the current waveform having been smoothed. The ringer IC 10 is driven by a signal having these waveforms shown in FIG. 12.

The above mentioned prior art is prone to the following problem. Pulse noise is radiated around, and is applied to a subsequent circuit, because of a switching operation in each transistor or harmonics contained in a rectangular wave voltage to be applied across the terminals a and b. This problem is caused by rectangular wave oscillation.

Japanese Patent Laid-Open Publication No. Hei 7-30649 discloses a technique by which a rectangular wave is subjected to wave shaping and is then supplied to a subsequent circuit. The foregoing problem can be at least partially solved by applying this technique to the prior part. However, another problem still remains unsolved in spite of the above technique. Specifically, when an output from the circuit shown in FIG. 7 is supplied to the circuit shown in FIG. 9, and if R and C constituting an RC integrator have large values, the ringer IC cannot be driven and therefore a ringing tone will not be generated. In Japan, R and C have maximum values of 2000 Ω and 300 $\mu$F, respectively. If the R or C used have values close to or exceeding the respective maximum values, it is not possible to produce the smoothed current wave as shown in FIG. 12. Further, a current wave may fluctuate extensively, as shown in FIG. 13. If a current having such a waveform is provided, only a small average current can be obtained. Therefore, the ringer IC 10 provided in the subsequent stage will not be activated.

In order to solve the second problem, for example, the frequency of an output signal from the circuit of FIG. 7 may be sufficiently increased. For example, the frequency may be increased from 16 Hz up to 25 Hz or 50 Hz. If such a high frequency were used, significant fluctuation would not appear in the current waveform between the terminals e and f, as shown in FIG. 14. In this case, since an average current is increased compared to the case where a low frequency of 16 Hz is used, the ringer IC 10 can be driven. However, this method still presents the following problem: if the frequency is high, the R and C can drive a large load, but the R and C is not applicable to a normal load, such as a circuit shown in FIG. 8.

SUMMARY OF THE INVENTION

The object of the present invention is to eliminate pulse noise and to enable generation of a ringing tone regardless of the type of telephone set. In accordance with the present invention, these objects are achieved by improving an oscillator.

In a preferred embodiment of the present invention, there is provided a ringer circuit comprising a power supply for providing a supply voltage and an oscillator which oscillates when the supply voltage is applied from the power supply. An output from the oscillator is supplied to an integrator via a rectifier. The oscillator generates a sine wave having a sufficiently long cycle compared to the time constant of the integrator. According to a further detailed embodiment of the present invention, the power supply is a switching power supply, which has a single resistor functioning both as a d.c. drive resistor and as an a.c. drive resistor of a transistor for oscillation.

In this arrangement, the oscillator generates a sine wave. As a result, the problems which were caused by a rectangular wave, such as generation of pulse noise, can be eliminated. Further, in the prior art, an output voltage has a rectangular waveform, and the current waveform of a signal to be inputted to the subsequent circuit is in the shape of a pulse, as already described. In the present invention, on the contrary, the current waveform is a sine wave. Therefore, no extensive fluctuation will be caused in the current waveform of a signal which is obtained by rectifying and integrating an oscillation output. Thus, it is possible to optimally drive a subsequent circuit (e.g. a ringer IC) regardless of the type of telephone set so as to generate a ringing tone. Further, according to the present invention, a single resistor is provided both as a d.c. drive resistor and as an a.c. drive resistor for the transistor in the power supply. The circuit structure is thus simplified and the number of circuit elements is also reduced, which allows an inexpensive circuit of reduced size to be produced.

DETAILED DESCRIPTION OF THE PREFERRED EMBODIMENTS

Figure 7:
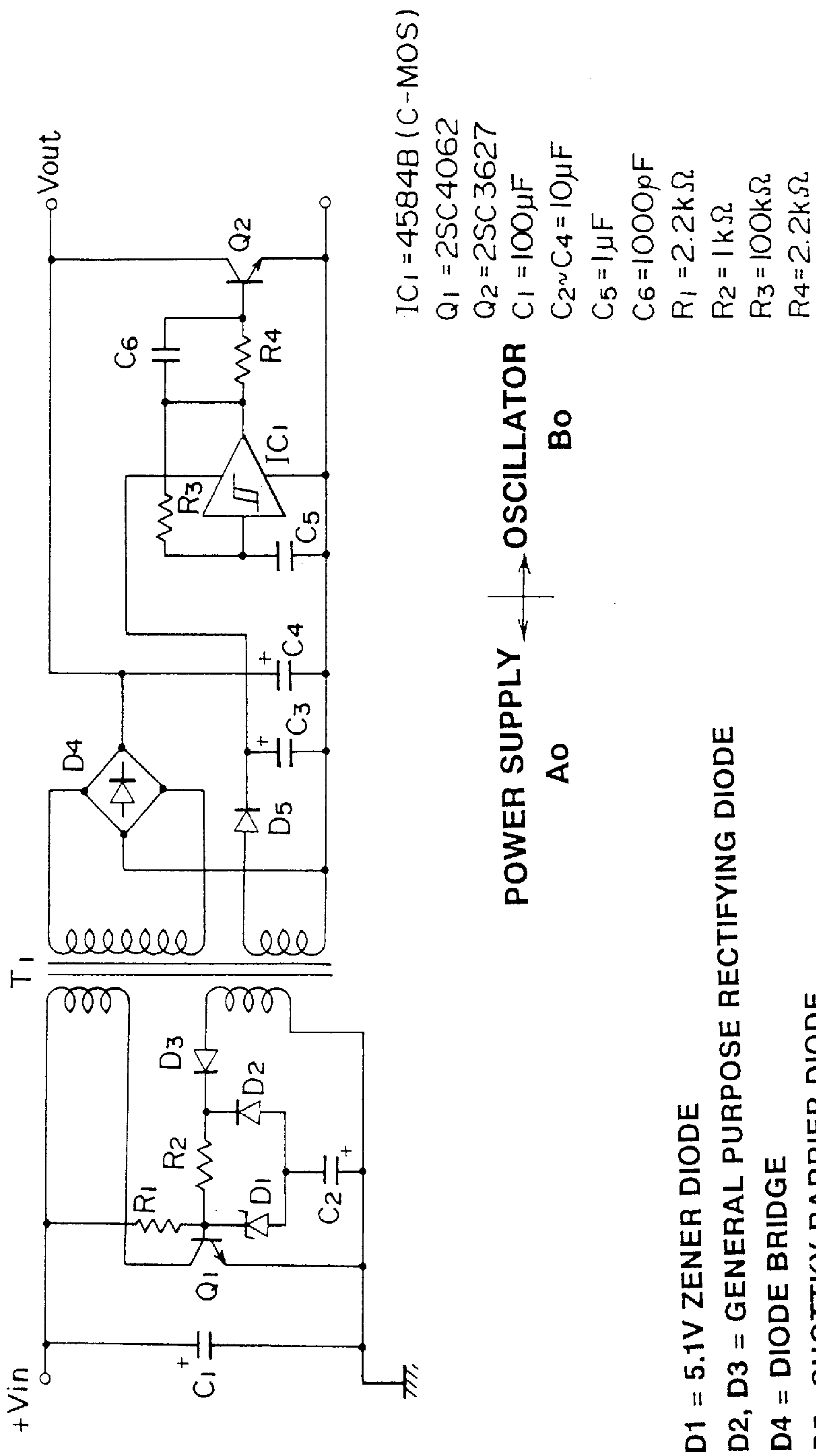
FIG. 7 is a circuit diagram illustrating the configuration of a ringer circuit in accordance with one example of prior art.

Preferred embodiments of the present invention will now be described with reference to the drawings. Circuit parts identical with or similar to those shown FIG. 7 are denoted by the same numerals, and will not be further described.

Figure 1:
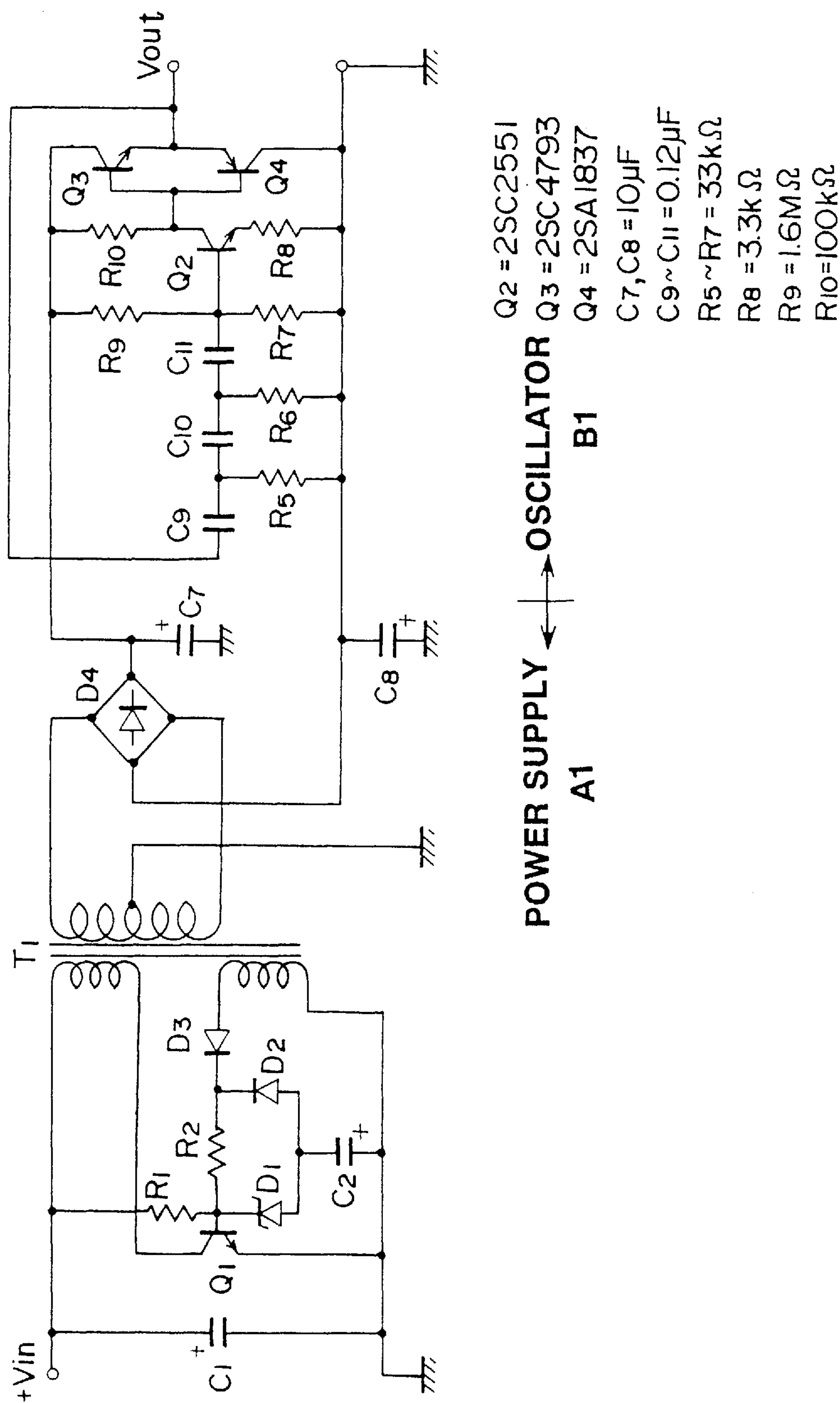
FIG. 1 is a circuit diagram illustrating the configuration of a ringer circuit in accordance with a first embodiment of the present invention.

Referring to FIG. 1, a ringer circuit in accordance with a first embodiment comprises an oscillator B1 and a power supply A1. The oscillator B1 is a sine wave oscillator, which includes a transistor Q2 for oscillation, bias resistors R7 to R10 for the transistor Q2, a coupling circuit and output transistors Q3 and Q4. The coupling circuit includes capacitors C9 to C11 and resistors R5 and R6. Capacitors C7 and C8 in the power supply A1 are power supply capacitors of a diode bridge D4.

An amplified output from the transistor Q2 is fed back to a base of the transistor Q2 via the transistors Q3 and Q4 and the coupling circuit. Therefore, selection of appropriate elements enables a desired sine wave oscillation. A sine wave output is advantageous over the rectangular wave output in the prior art, in that pulse noise can be reduced. Here, it is possible, for example, to use 2SC2551 as Q2, 2SC4793 as Q3, 2SA1837 as Q4, 10 μpF as C7 and C8, 0.12 μF as C9 to C11, 33 kΩ as R5 to R7, 3.3 kΩ as R8, 1.6 MΩ as R9, and 100 kΩ as R10, respectively.

Further, in this embodiment, it is possible to optimally generate a ringing tone in a circuit provided at the subsequent stage, regardless of the type of circuit. That is, either of the circuits shown FIG. 8 or FIG. 9 may be used. Also, the circuit can generate a ringing tone even when R and C have relatively large values.

Figure 2:
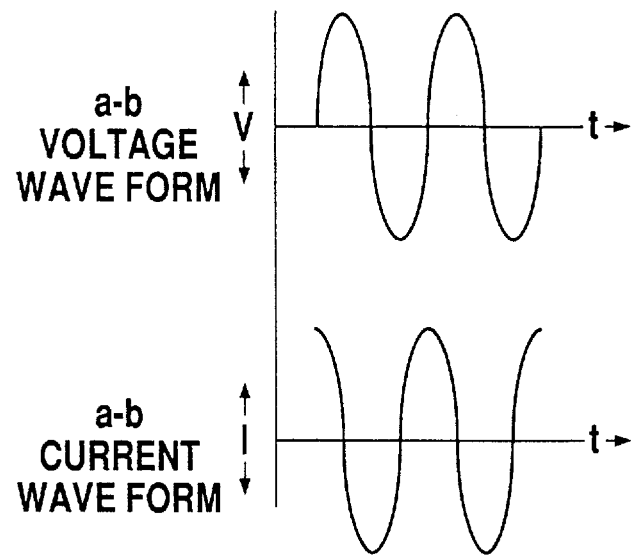
FIG. 2 depicts a voltage waveform and current waveform appearing between the terminals a and b of a circuit shown in FIG. 9, when an oscillation output is applied to the circuit in accordance with the first embodiment.
Figure 3:
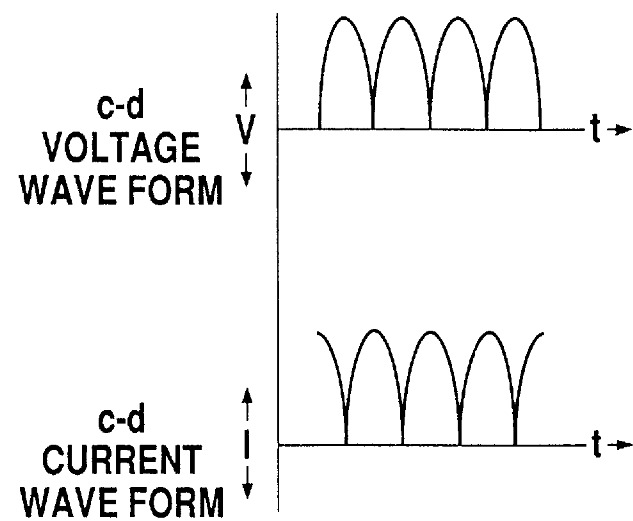
FIG. 3 depicts a voltage waveform and current waveform, respectively, obtained by full-wave rectifying the voltage waveform and the current waveform shown in FIG. 2.
Figure 4:
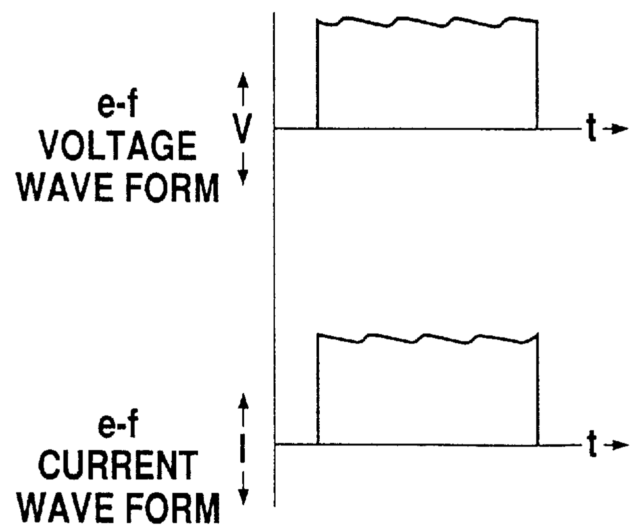
FIG. 4 depicts a voltage waveform and current waveform, respectively, obtained by integrating the voltage waveform and the current waveform shown in FIG. 3.
Figure 5:
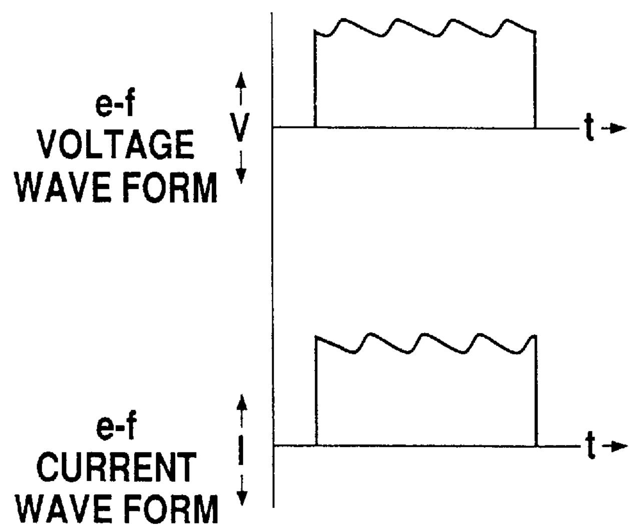
FIG. 5 depicts the waveforms similar to those shown in FIG. 4 when a load is heavy.
Figure 8:
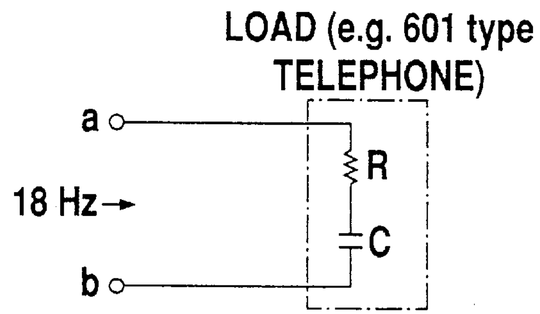
FIG. 8 is a diagram representing a load such as a telephone set with only R and C.
Figure 9:
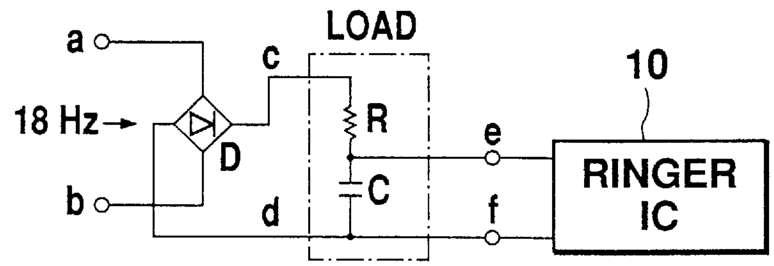
FIG. 9 is a diagram illustrating the configuration of a circuit in which an output signal having 16 Hz is rectified and integrated for driving a ringer IC.
Figure 10:
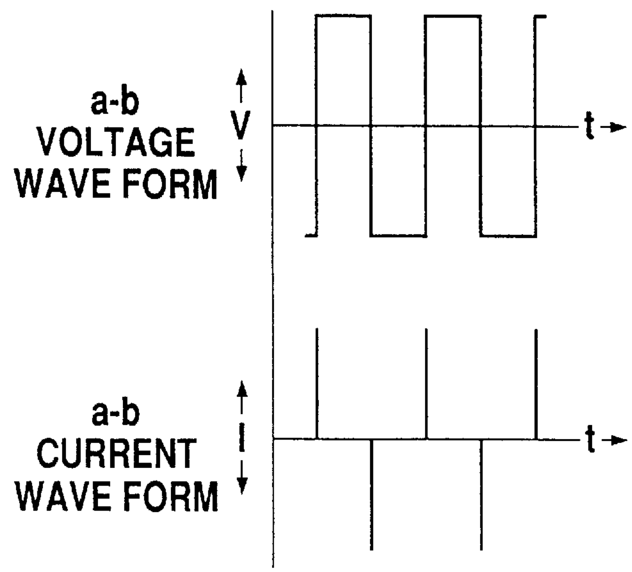
FIG. 10 depicts a voltage waveform and current waveform of the prior art of FIG. 7, which are applied between the terminals a and b of the circuit shown in FIG. 9.
Figure 11:
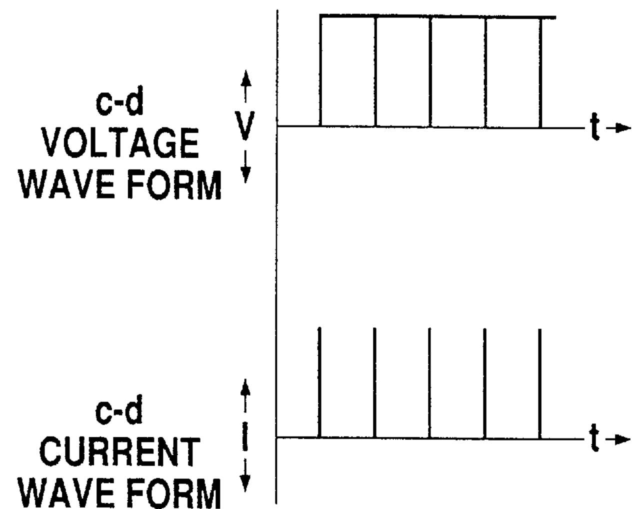
FIG. 11 depicts a voltage waveform and current waveform, respectively, obtained by full-wave rectifying the voltage waveform and the current waveform shown in FIG. 10.
Figure 12:
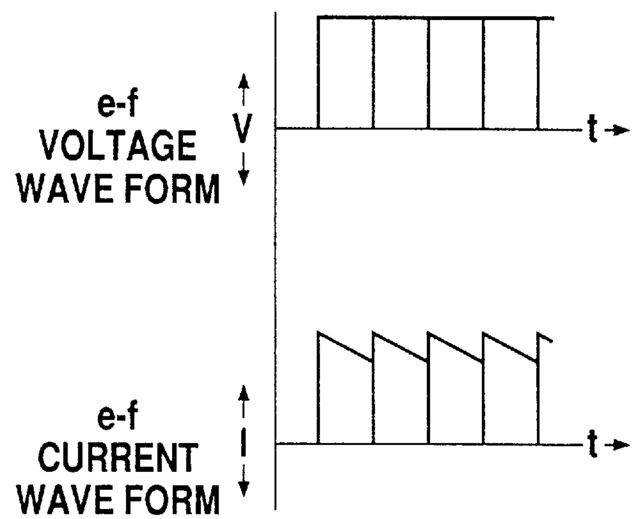
FIG. 12 depicts a voltage waveform and current waveform, respectively, obtained by integrating the voltage waveform and the current waveform shown in FIG. 11.
Figure 13:
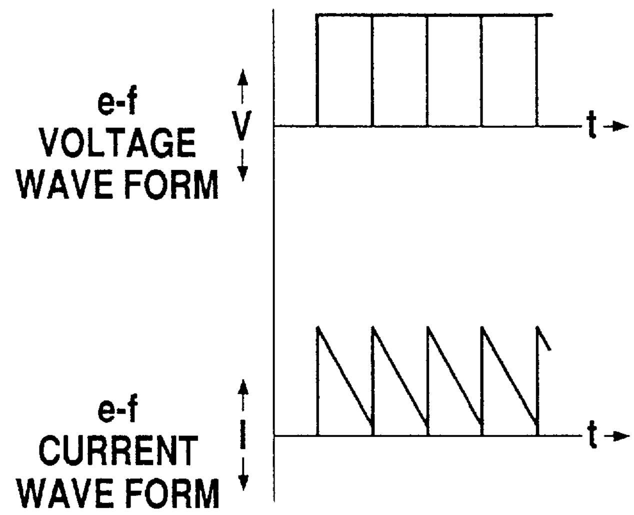
FIG. 13 depicts waveforms similar to those shown in FIG. 12 when a load is heavy.
Figure 14:
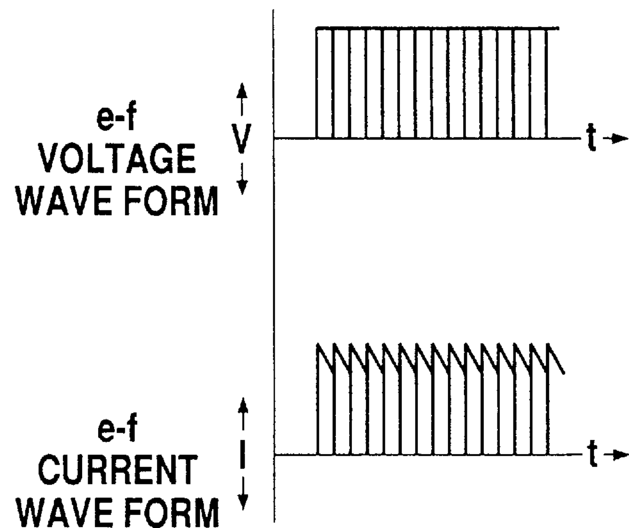
FIG. 14 depicts voltage waveform and current waveform applied to a ringer IC when the frequency of an oscillation output is increased.

Now, a case where an output from the circuit in FIG. 1 is supplied to the circuit in FIG. 9, will be considered as an example. In this case, the voltage waveform and the current waveform in FIG. 2 appear between the terminals a and b of the circuit in FIG. 9. Between the terminals c and d, which are output terminals of the diode bridge D, full-wave rectified waveforms as shown in FIG. 3 appear. When a signal having such waveforms is supplied to the RC integrator, a current is smoothed by a capacitor C and, as a result, a voltage waveform and current waveform as shown in FIG. 4 will appear. Further, even if the values of R and C are increased, that is, even if the load is heavy, the fluctuation in the current waveform appearing in the terminals e and f is relatively small, as shown in FIG. 5. Therefore, according to this embodiment, it is possible to drive the ringer IC 10 regardless of the magnitude of the load. Also, since the oscillation output is not set to a high frequency, such as 25 Hz or 50 Hz frequency, it is possible to drive a load such as a telephone set with only R and C as shown in FIG. 8, so that it will generate a ringing tone.

Figure 6:
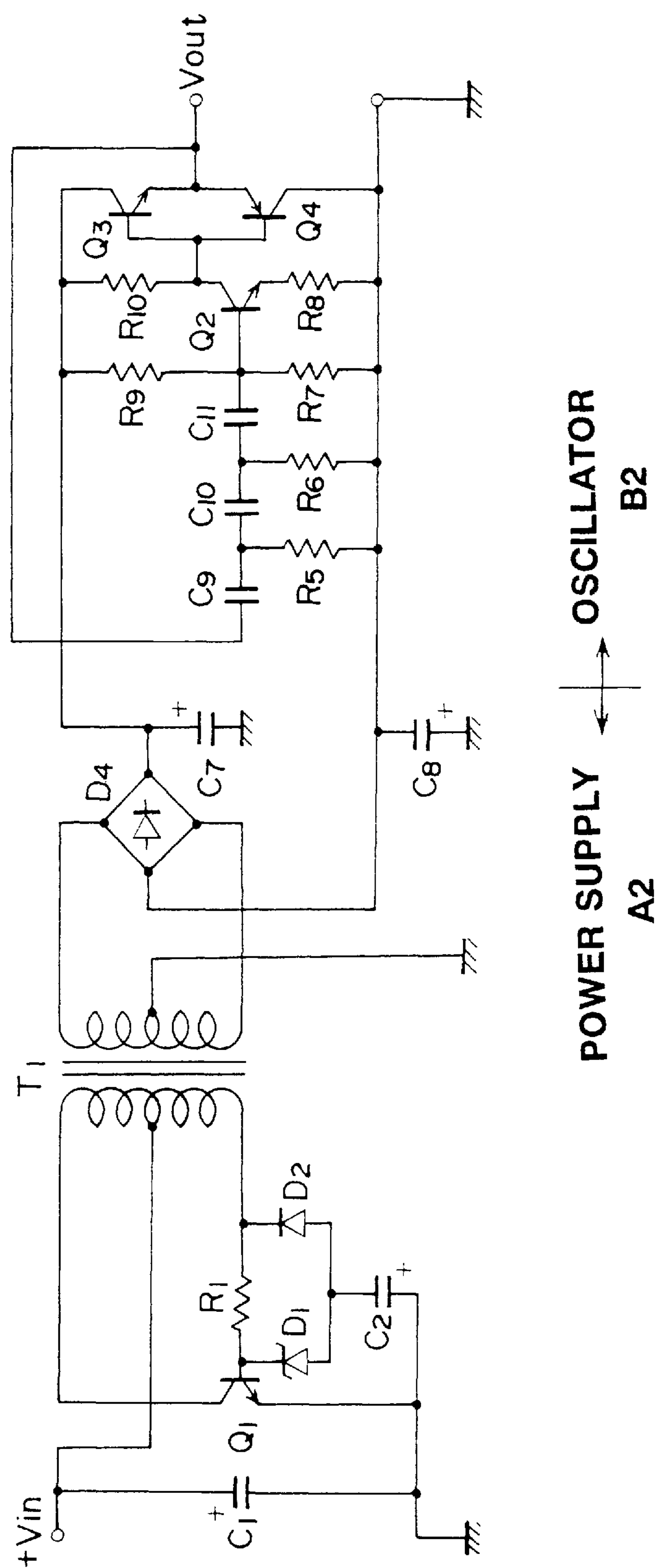
FIG. 6 is a circuit diagram illustrating the configuration of a ringer circuit in accordance with a second embodiment of the present invention.

FIG. 6 shows the configuration of a ringer circuit in accordance with a second embodiment of the present invention. In this embodiment, the driving circuit of a transistor Q1 for oscillation in the power supply A2 is different from that of the first embodiment in the following respect: the base of the transistor Q1 is driven both by applying a.c. and by applying d.c., via a single resistor R1. More specifically, a further improvement of the power supply A2 constituted as a switching power supply, and particularly, an improvement of the base driving circuit of the transistor for oscillation Q1, have made it possible to reduce the number of circuit parts, for example, by sharing a single drive resistor. Thus, simplification of the circuit structure can be attained. As a result, a circuit which is further reduced in size and is less expensive compared to that of the first embodiment can be implemented. With regard to the oscillator B2, it has a structure identical to that of the oscillator B1.

It should be noted that the present invention is not limited with respect to the detailed circuit structure and the design values of components in the power supply and the oscillator. Any appropriate combinations of a power supply and an oscillator are possible. For example, an RCC type, a forward comparator, a push-pull comparator, or a half-bridge comparator may be used as a power supply, while a phased oscillator, or Wien bridge may be used as an oscillator. If a phased type is used as the oscillator, it is possible to select whether or not the oscillator is independent from an amplifier. An amplitude regulator may be provided in the oscillator. An output transistor may be Darlington-connected in the amplifier.

While there have been described what are at present considered to be preferred embodiments of the invention, it will be understood that various modifications may be made thereto, and it is intended that the appended claims cover all such modifications as fall within the true spirit and scope of the invention.

We claim:

1. A ringer circuit comprising:

a power supply for providing a supply voltage, wherein the power supply is a switching power supply which includes a transistor for oscillation, a d.c. drive resistor used for d.c. drive of the transistor for oscillation. and an a.c. drive resistor used for a.c. drive of the transistor for oscillation, and wherein the d.c. drive resistor and the a.c. drive resistor are implemented by a single resistor; and an oscillator for generating a sine wave when the supply voltage is applied from the power supply, the sine wave being supplied to an integrator via a rectifier.

2. A switching power supply for providing a supply voltage to an oscillator of a ringer circuit, said switching power supply comprising a transistor for oscillation, a d.c. drive resistor used for d.c. drive of the transistor for oscillation, and an a.c. drive resistor used for a.c. drive of the transistor for oscillation, and wherein the d.c. drive resistor and the a.c. drive resistor are implemented by a single resistor.

3. A switching power supply according to claim 2, further comprising a rectifier and a transformer connected between said transistor for oscillation and said rectifier, wherein said transformer and said rectifier are operative for producing a supply voltage sufficient to supply the rectifier with all of the power required to cause the sine wave generated by the oscillator to generate a ringing tone in a telephone set.

4. A ringer circuit according to claim 1 wherein said switching power supply further comprises: a rectifier and a transformer connected between said transistor for oscillation and said rectifier, wherein said transformer and said rectifier are operative for producing a supply voltage sufficient to supply the rectifier with all of the power required to cause the sine wave generated by the oscillator to generate a ringing tone in a telephone set.

* * * * *